(12) United States Patent
Mochizuki (10) Patent No.: US 11,194,403 B2
(45) Date of Patent: Dec. 7, 2021

(54) REFERENCE POSITION SETTING METHOD AND VIRTUAL IMAGE DISPLAY DEVICE

(71) Applicant: MURAKAMI CORPORATION, Shizuoka (JP)

(72) Inventor: Takayoshi Mochizuki, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 16/969,032

(22) PCT Filed: Feb. 5, 2019

(86) PCT No.: PCT/JP2019/004060
§ 371 (c)(1),
(2) Date: Aug. 11, 2020

(87) PCT Pub. No.: WO2019/159762
PCT Pub. Date: Aug. 22, 2019

(65) Prior Publication Data
US 2021/0035527 A1 Feb. 4, 2021

(30) Foreign Application Priority Data
Feb. 19, 2018 (JP) .............................. JP2018-026995

(51) Int. Cl.
*G06F 3/048* (2013.01)
*G09G 5/02* (2006.01)
(Continued)

(52) U.S. Cl.
CPC ............ *G06F 3/017* (2013.01); *G06F 3/0425* (2013.01); *G09G 5/02* (2013.01); *G09G 2320/0626* (2013.01); *G09G 2354/00* (2013.01)

(58) Field of Classification Search
CPC combination set(s) only.
See application file for complete search history.

(56) References Cited

U.S. PATENT DOCUMENTS

2015/0149964 A1* 5/2015 Bernstein .............. G06F 3/0481
715/836
2017/0153712 A1 6/2017 Kawai et al.
(Continued)

FOREIGN PATENT DOCUMENTS

JP 2011-227600 A 11/2011
JP 2017-97716 A 6/2017

OTHER PUBLICATIONS

International Search Report issued in International Patent Application No. PCT/JP2019/004060, dated Apr. 23, 2019.
(Continued)

*Primary Examiner* — Wesner Sajous
(74) *Attorney, Agent, or Firm* — Greenblum & Bernstein, P.L.C.

(57) ABSTRACT

A reference position setting method according to the present disclosure is a reference position setting method for setting a reference position for recognizing whether or not an operation unit displayed as a virtual image has been operated. The reference position setting method includes: a step of displaying a marker displayed as a virtual image larger than an object approaching the marker; a step of detecting the object approaching the marker; and a step of making a color or shade of the outer edge of the marker different from a color or shade of the center of the marker after the step of detecting the object.

10 Claims, 6 Drawing Sheets

(51) Int. Cl.
*G06F 3/01* (2006.01)
*G06F 3/042* (2006.01)

(56) References Cited

U.S. PATENT DOCUMENTS

2017/0265947 A1* 9/2017 Dyer .................. G16H 40/63
2019/0258320 A1* 8/2019 Yang .................. G06T 19/006

OTHER PUBLICATIONS

Sep. 3, 2020 International Preliminary Report on Patentability and Written Opinion of International Searching Authority in PCT/JP2019/004060.

* cited by examiner

REFERENCE POSITION SETTING METHOD AND VIRTUAL IMAGE DISPLAY DEVICE

TECHNICAL FIELD

The present disclosure relates to a reference position setting method and a virtual image display device.

BACKGROUND ART

Japanese Unexamined Patent Publication No. 2011-227600 discloses a position detection system for detecting a position where a predetermined operation is performed on an image projected from a projector. The position detection system includes a projector that displays an image on a predetermined projection surface, an imaging apparatus for capturing an image displayed on the projection surface, a light emitting pen having a pen tip that is pressed against the projection surface, and a computer that controls the projector and the imaging apparatus.

The position detection system performs a calibration as an operation for associating positions between the projected image and the captured image. The computer described above includes a control device that enables accurate position detection by correcting the detected position based on the result of calibration. As the calibration, a manual calibration in which calibration is performed based on a user's operation and an auto-calibration in which the user's operation is not required and calibration is automatically performed based on the imaging result of an imaging apparatus can be mentioned.

The control device projects a first calibration image on the projection surface, and determines whether or not the state is suitable for auto-calibration based on the first calibration image captured by the imaging apparatus. When it is determined that the state is suitable for auto-calibration, the control device performs auto-calibration that does not require a user's operation. On the other hand, when it is determined that the state is not suitable for auto-calibration, the control device projects a second calibration image on the projection surface to perform a manual calibration.

The control device causes the user to perform a pressing operation with the light emitting pen at a plurality of positions on the second calibration image. Specifically, in the position detection system, the control device projects the second calibration image on the projection surface, and the user performs a manual calibration by performing a pressing operation with the light emitting pen on the second calibration image. Thus, a method is known in which a light emitting pen approaches a predetermined position on the image to perform a calibration.

CITATION LIST

Patent Literature

Patent Literature 1: Japanese Unexamined Patent Publication No. 2011-227600

SUMMARY OF INVENTION

Technical Problem

As described above, in the method in which an object, such as a light emitting pen or a finger, approaches a predetermined position on the image to perform a calibration, the size of the image as an approach target may be a problem. Specifically, when the image as an approach target is too small, a problem that the image is difficult to see may occur. On the other hand, when the image as an approach target is too large, the range of the image that the object approaches is large, which may cause a problem that the accuracy of the calibration decreases.

It is an object of the present disclosure to provide a reference position setting method and a virtual image display device that can make it easy to see an image that an object approaches and can perform a calibration with high accuracy.

Solution to Problem

A reference position setting method according to the present disclosure is a reference position setting method for setting a reference position for recognizing whether or not an operation unit displayed as a virtual image has been operated. The reference position setting method includes: a step of displaying a marker displayed as a virtual image larger than an object approaching the marker; a step of detecting the object approaching the marker; and a step of making a color or shade of an outer edge of the marker different from a color or shade of a center of the marker after the step of detecting the object.

A virtual image display device according to the present disclosure is a virtual image display device for setting a reference position for recognizing whether or not an operation unit displayed as a virtual image has been operated. The virtual image display device includes: an aerial image forming element that displays a marker displayed as a virtual image larger than an object approaching the marker; a sensor that detects the object approaching the marker; and a control unit that controls display of the virtual image by the aerial image forming element. When the object approaching the marker is detected by the sensor, the control unit makes a color or shade of an outer edge of the marker displayed by the aerial image forming element different from a color or shade of a center of the marker.

In the reference position setting method and the virtual image display device, the marker for setting the reference position is displayed as a virtual image, and the marker is displayed larger than the object approaching the marker. Therefore, it is possible to prevent the marker from being hidden by the approaching object and display the marker in an easily visible manner. As a result, since the marker, which is an image that the object approaches, can be easily seen, the calibration can be efficiently performed. In the reference position setting method and the virtual image display device, after the object approaches the marker and the object is detected, the color or shade of the outer edge of the marker is made different from the color or shade of the center of the marker. Therefore, the object can be guided to the center of the marker by making the color or shade of the outer edge of the marker different from the color or shade of the center of the marker. That is, the object can be guided to the center of the marker by making the color or shade of the outer edge of the marker different from the color or shade of the center of the marker in a state in which the object has approached the marker. Therefore, since the range of the image that the object approaches can be narrowed by making the color or shade of the outer edge of the marker, which is an image that the object approaches, different from the color or shade of the center of the marker, the calibration can be performed with high accuracy.

In the step of making the color or shade of the outer edge of the marker different from the color or shade of the center of the marker, the marker may be changed to a color or shade, which is difficult to visually recognize, from the outer edge of the marker. In this case, by changing the color or shade of the marker to a color or shade, which is difficult to visually recognize, from the outer edge of the marker, the object can be guided to the center of the marker that is relatively easy to visually recognize. Therefore, since the object can approach the center of the marker more reliably, highly accurate calibration can be performed more reliably.

In the step of making the color or shade of the outer edge of the marker different from the color or shade of the center of the marker, the marker may be changed to be transparent from the outer edge of the marker. In this case, by changing the marker to be transparent from the outer edge of the marker, the object can be guided to the center of the marker more reliably. Therefore, highly accurate calibration can be performed more reliably.

The shape of the marker may be circular. In this case, by displaying the marker in a circular shape, the center of the marker can be easily understood. Therefore, since the object can be guided more reliably to the center of the marker, the reliability of the highly accurate calibration can be further increased.

Advantageous Effects of Invention

According to the present disclosure, it is possible to make it easy to see an image that an object approaches and perform a calibration with high accuracy.

BRIEF DESCRIPTION OF DRAWINGS

Part (a) of FIG. 4 is a diagram illustrating the marker in FIG. 3 before being changed.

Part (b) of FIG. 4 is a diagram illustrating the marker in FIG. 3 after being changed.

Part (a) of FIG. 6 is a diagram illustrating a marker in a second embodiment before being changed.

Part (b) of FIG. 6 is a diagram illustrating the marker in the second embodiment after being changed.

DESCRIPTION OF EMBODIMENTS

Hereinafter, embodiments of a reference position setting method and a virtual image display device according to the present disclosure will be described with reference to the diagrams. In the description of the diagrams, the same or equivalent elements are denoted by the same reference numerals, and repeated description thereof will be omitted. For ease of understanding, parts of the diagrams are simplified or exaggerated, and the dimensional ratios and the like are not limited to those described in the diagrams.

In this specification, an "object" is an object detected by a sensor and operates an operation unit to operate the device and is, for example, a rod-shaped object such as a finger of a user. The "operation unit" is a part capable of operating the device, and is, for example, a button such as a switch displayed as a virtual image. The "sensor" is a sensor that detects that the operation unit has been operated by an object. A "reference position" is a position as a reference for recognizing whether or not the operation unit has been pressed, and is, for example, a predetermined position with respect to the operation unit displayed as a virtual image. The predetermined position may be the position of the virtual image itself, or may be a position separated from the virtual image by a predetermined distance.

First Embodiment

Figure 1:
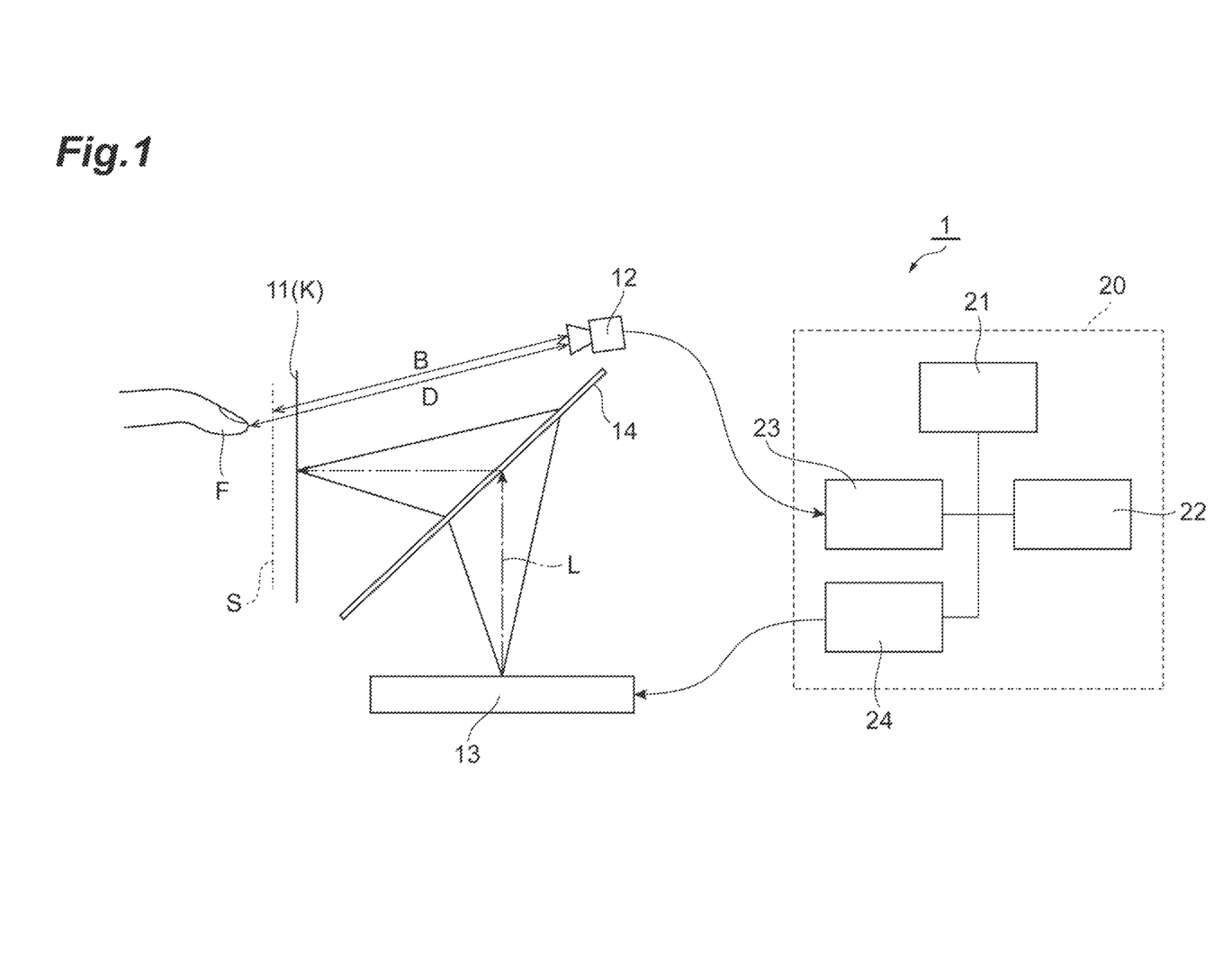
FIG. 1 is a schematic configuration diagram illustrating a virtual image display device according to an embodiment.

FIG. 1 illustrates a virtual image display device 1 according to a first embodiment. As illustrated in FIG. 1, the virtual image display device 1 displays, as a virtual image K, an operation unit 11 for operating respective devices (such as a vehicle-mounted back camera or an air conditioner) mounted in a vehicle, for example. The user can operate each of the above devices by operating the operation unit 11 displayed as the virtual image K. Specifically, the user brings an object F including a rod-shaped object, such as a finger or a pen, close to the operation unit 11 and a sensor 12 detects the approaching object F, so that each device can operate. "Approaching" in this specification includes both a case of touching an approach target and a case of approaching the target by a predetermined distance. As described above, in the virtual image display device 1, since the operation unit 11 is displayed as the virtual image K and each device can be operated by the approach of the object F to the operation unit 11, physical buttons and the like are not necessary.

The virtual image display device 1 includes the operation unit 11 and the sensor 12 described above, a display device 13 such as a display, an aerial image forming element 14 that receives light L from the display device 13 and displays the operation unit 11 that is the virtual image K, and a control unit 20 that receives a detection result of the object F from the sensor 12 and controls the display of the display device 13. The control unit 20 can communicate with the sensor 12 and the display device 13.

Figure 2:
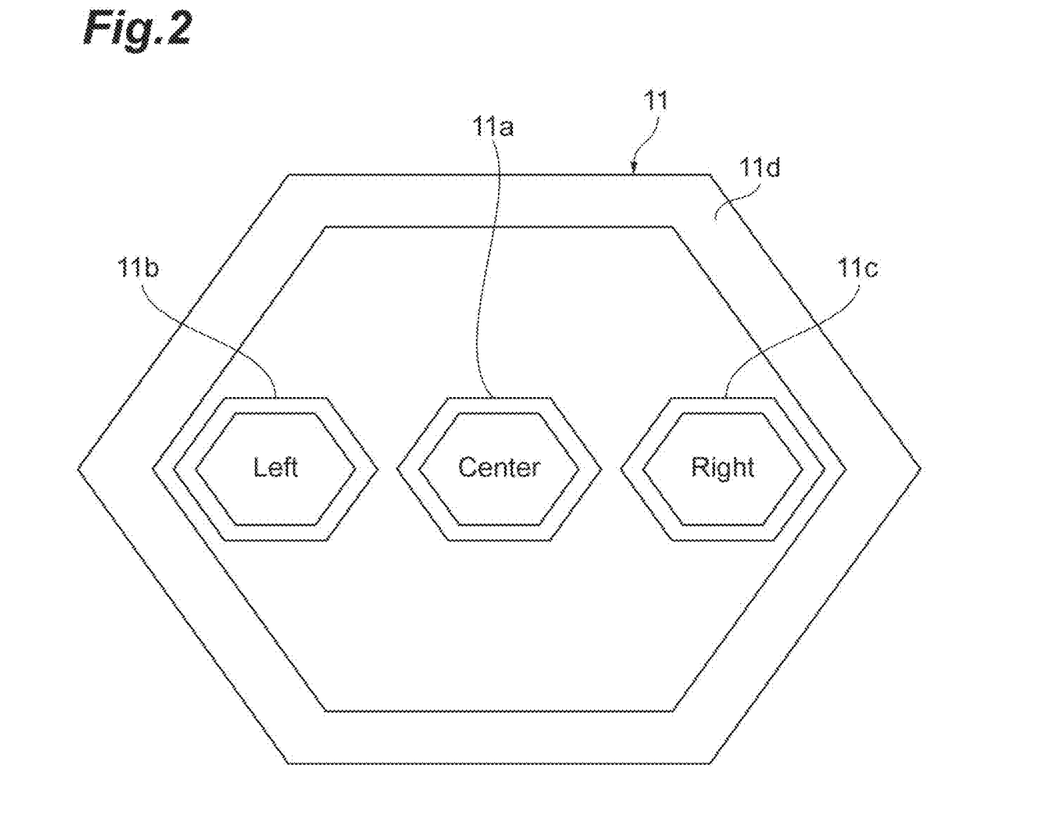
FIG. 2 is a diagram illustrating an example of an operation unit displayed by the virtual image display device illustrated in FIG. 1.

As illustrated in FIG. 2, the operation unit 11 is, for example, an operation unit capable of operating a vehicle-mounted back camera, and can switch the imaging position of the vehicle-mounted camera by pressing each button of the operation unit 11. As an example, the operation unit 11 includes a first virtual image button 11a for imaging the rear side of the vehicle, a second virtual image button 11b for imaging the left side of the vehicle, a third virtual image button 11c for imaging the right side of the vehicle, and a virtual image frame portion 11d surrounding the first virtual image button 11a, the second virtual image button 11b, and the third virtual image button 11c. The first virtual image button 11a, the second virtual image button 11b, the third virtual image button 11c, and the virtual image frame portion 11d each have, for example, a horizontally long hexagonal shape.

As illustrated in FIG. 1, the sensor 12 is provided, for example, on a side of the operation unit 11 opposite to the object F. The sensor 12 is, for example, a depth sensor that detects a distance D from the object F to the sensor 12. For example, the sensor 12 detects the distance D by measuring the time until light reflected from the object F by the emission of light returns to the sensor 12. The distance D detected by the sensor 12 is output to the control unit 20, and the control unit 20 determines whether or not the distance D is equal to or less than a threshold value B. As an example, the value of the threshold value B is 180 mm or more and 220 mm or less. When the control unit 20 determines that the distance D is equal to or less than the threshold value B, the control unit 20 determines that the object F has reached a virtual pressing determination surface S and the operation unit 11 is being operated.

The pressing determination surface S is a virtual surface formed in a region where the distance from the sensor 12 is constant, and is provided at a position near the operation unit 11. The position of the pressing determination surface S may match the position of the operation unit 11, or may be a position separated from the operation unit 11 by a predetermined distance. The user brings the object F into contact with the pressing determination surface S in order to operate the operation unit 11. The control unit 20 determines that the operation unit 11 is being operated according to the contact of the object F with the pressing determination surface S, and then operates a device, such as the vehicle-mounted back camera described above.

The display device 13 is, for example, a liquid crystal panel. The display device 13 may be a display of a PC (personal computer), a tablet terminal, or a mobile terminal such as a mobile phone. The aerial image forming element 14 displays an image of the display device 13 as the virtual image K at a position in front of the aerial image forming element 14 and the display device 13 (that is, the object F side, the user side). For example, the light L emitted upward from the display device 13 and incident on the aerial image forming element 14 is reflected by the aerial image forming element 14 a plurality of times (for example, twice), and the operation unit 11 is formed as the virtual image K in a space on the user side.

In this manner, the position where the operation unit 11 is formed as an image is in front of the display device 13 and the aerial image forming element 14 (that is, on the object F side or the user side). Therefore, it is possible to make the operation unit 11 easy to visually recognize and to improve the operability of the operation unit 11 by the user. The aerial image forming element 14 is, for example, an AI (Aerial Imaging) plate (registered trademark) for forming an image in the air, and the AI plate is manufactured using the technique described in Japanese Patent No. 4865088.

The control unit 20 includes, for example, a CPU (Central Processing Unit) 21, a storage unit 22 including a ROM (Read Only Memory) and a RAM (Random Access Memory), an interface 23 to which data from the sensor 12 is input, and a video driver 24 for driving the display device 13. The control unit 20 loads a program stored in the ROM of the storage unit 22 into the RAM, and the CPU 21 executes the program to control the operation of each device.

The virtual image display device 1 configured as described above sets a reference position that is a reference for recognizing whether or not the operation unit 11 has been pressed by the object F. The reference position is set, for example, during the initial operation of the virtual image display device 1 or during the maintenance of the virtual image display device 1. This setting of the reference position may be referred to as calibration below. The virtual image display device 1 performs a calibration by recognizing the object F approaching a predetermined position displayed by the aerial image forming element 14.

Figure 3:
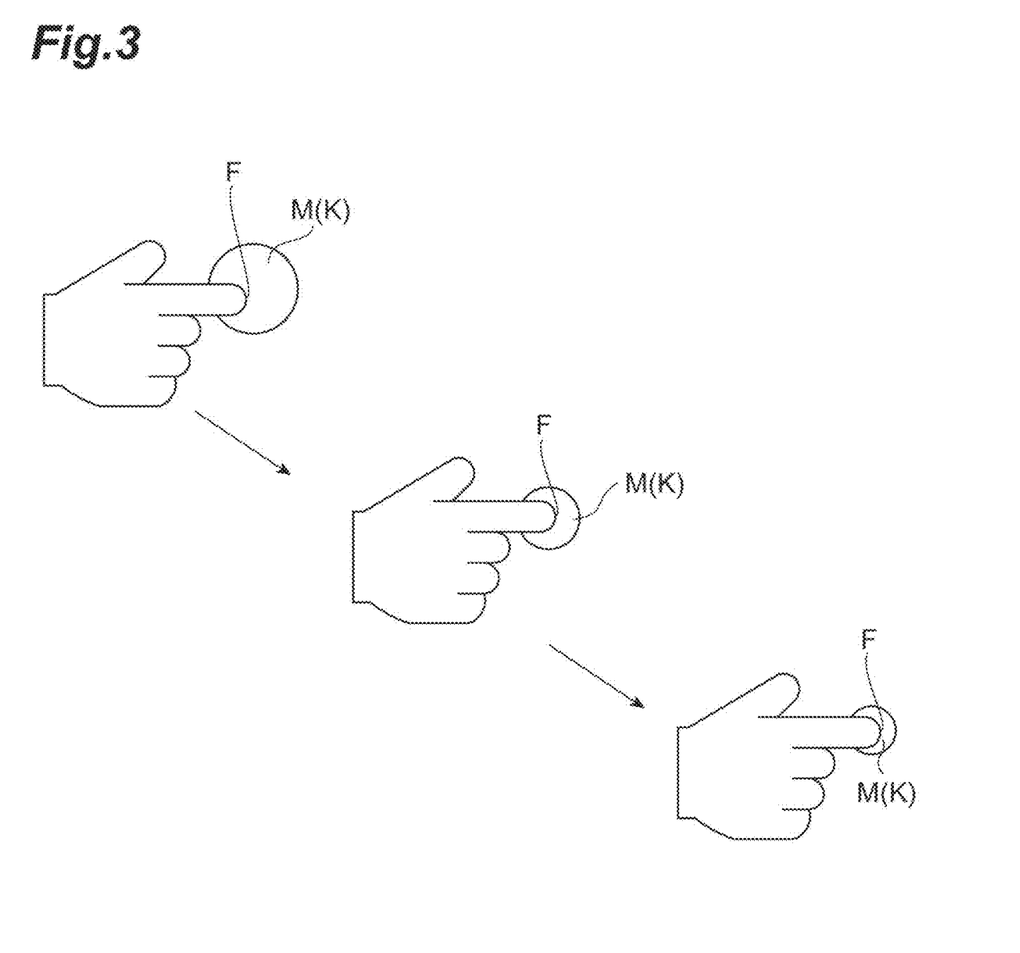
FIG. 3 is a diagram schematically illustrating a change in a marker displayed by the virtual image display device illustrated in FIG. 1.

Specifically, as illustrated in FIG. 3, a marker M is displayed as the virtual image K by the aerial image forming element 14, and the user brings the object F close to the marker M. Then, the sensor 12 and the control unit 20 recognize the object F, and the control unit 20 performs a calibration. The control unit 20 controls the display device 13 to display the marker M larger than the object F before and immediately after the object F approaches the marker M and display the marker M gradually smaller after the object F approaches the marker M, for example.

Figure 4:
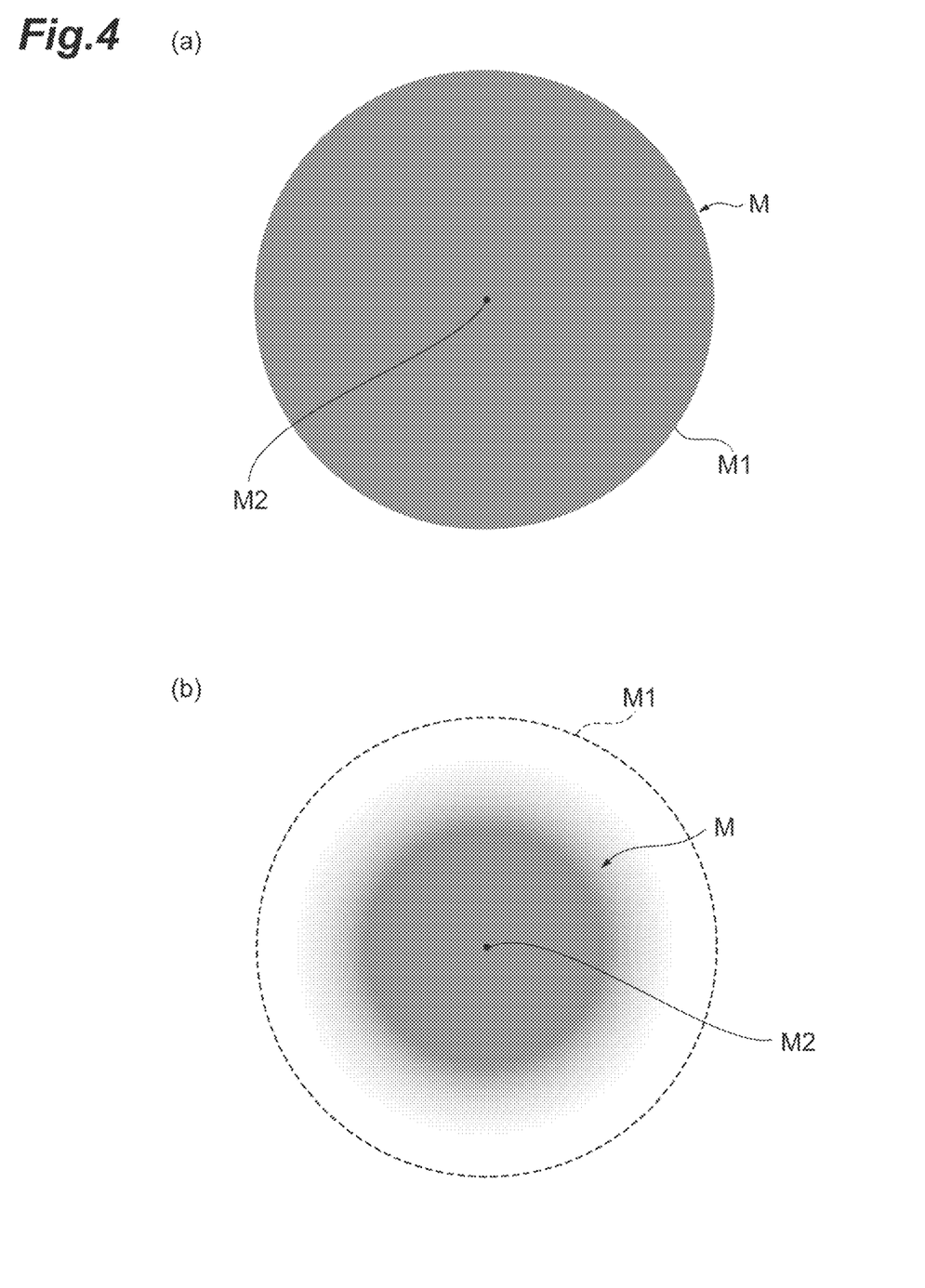

As illustrated in a part (a) of FIG. 4, the marker M is displayed in a circular shape. The diameter of the marker M before and immediately after the approach of the object F, for example, 4 cm or more and 5 cm or less. The area of the marker M may be four times or more and five times or less the area of the tip of the object F (for example, the area formed by the finger when the finger is viewed from the tip side in the longitudinal direction of the finger). The color of the marker M before and immediately after the approach of the object F is a color such as red that is easy to visually recognize, and is, for example, a uniform color without gradation.

As illustrated in a part (b) of FIG. 4, the marker M after the approach of the object F becomes gradually smaller, for example. Specifically, the color of the outer edge M1 of the marker M changes to be transparent toward the inner side in the radial direction of the marker M. As described above, making the marker M smaller includes making the color of the outer edge M of the marker M transparent. The control unit 20 guides the object F to the center M2 of the marker M by changing the outer edge M1 of the marker M to be transparent after the object F comes in contact with the marker M. Then, after the size of the marker M becomes as small as the size of the object F, the position of the object F at that time is set in the control unit 20 as a reference position.

Figure 5:
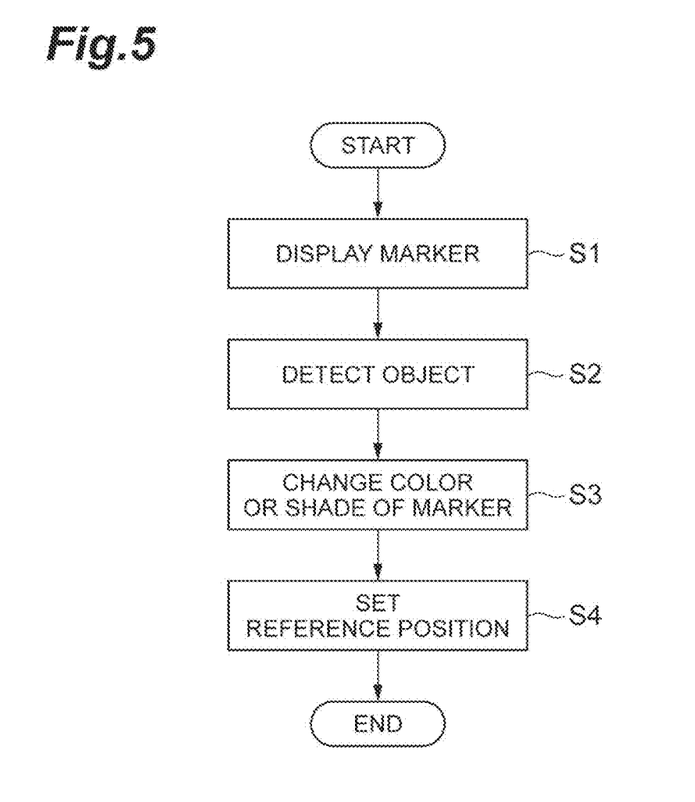
FIG. 5 is a flowchart illustrating a reference position setting method according to an embodiment.

Next, a reference position setting method according to the present embodiment will be described with reference to FIG. 5. FIG. 5 is a flowchart illustrating an example of the reference position setting method according to the present embodiment. This reference position setting method is performed using the virtual image display device 1. First, the control unit 20 controls the display device 13 to display the marker M on the aerial image forming element 14 (step S1; a step of displaying a marker). At this time, the aerial image forming element 14 displays the marker M larger than the object F. Then, the user visually recognizes the marker M and brings the object F, such as a finger, close to the marker M.

When the object F approaches the marker M, the sensor 12 detects the object F (step S2; a step of detecting an object). Specifically, as illustrated in FIG. 1, the sensor 12 detects the distance D between the sensor 12 and the object F, and the distance D is output to the control unit 20. Then, the control unit 20 determines whether or not the distance D is equal to or less than the threshold value B. Then, the control unit 20 recognizes the approach of the object F to the marker M when it is determined that the distance D is equal to or less than the threshold value B, and accordingly, the object F is detected by the sensor 12.

After the sensor 12 detects the object F as described above, the control unit 20 controls the display device 13 to change the color or shade of the marker M (step S3; a step of changing the color or shade of a marker). At this time, as illustrated in the part (b) of FIG. 4 the color of the center M2 of the marker M is maintained in the original state, and the color of the outer edge M1 of the marker M changes to be transparent. In this manner, the control unit 20 reduces the marker M by making the outer edge M1 transparent.

After the control unit 20 reduces the marker M as described above, the control unit 20 sets the position of the object F at that time as a reference position (step S4; a step of setting the reference position). At this time, for example, the sensor 12 detects the object F a plurality of times, and the average value of the positions of the object F obtained from the plurality of detection results is set as the reference position. After the control unit 20 sets the reference position, a series of steps are completed, so that it is possible to use the virtual image display device 1 to operate each device.

Next, the operational effect of the reference position setting method and the virtual image display device 1 according to the present embodiment will be described. In the reference position setting method and the virtual image display device 1 according to the present embodiment, the marker M for setting the reference position is displayed as the virtual image K, and the marker M is displayed larger than the object F approaching the marker M. Therefore, it is possible to prevent the marker M from being hidden by the approaching object F and display the marker M in an easily visible manner.

As a result, since the marker M, which is an image that the object F approaches, can be easily seen, the calibration can be efficiently performed. In the reference position setting method and the virtual image display device 1, after the object F approaches the marker M and the object F is detected, the color or shade of the outer edge M1 of the marker M is made different from the color or shade of the center M2 of the marker M. Here, the "color or shade" includes hue, lightness, and saturation, and "making the color or shade different" includes changing at least one of hue, lightness, and saturation. In this manner, by making the color or shade of the outer edge M1 of the marker M different from the color or shade of the center M2 of the marker M, the object F can be guided to the center M2 of the marker M.

That is, the object F can be guided to the center M2 of the marker M by making the color or shade of the outer edge M1 of the marker M different from the color or shade of the center M2 of the marker M in a state in which the object F has approached the marker M. Therefore, since the range of the image that the object F approaches can be narrowed by making the color or shade of the outer edge M1 of the marker M, which is an image that the object F approaches, different from the color or shade of the center M2 of the marker M, the calibration can be performed with high accuracy.

In the step of making the color or shade of the outer edge M1 of the marker M different from the color or shade of the center M2 of the marker M, the marker M is changed to be transparent from the outer edge M1 of the marker M. Accordingly, by changing the marker M to be transparent from the outer edge M1 of the marker M, the object F can be more reliably guided to the center M2 of the marker M. Therefore, highly accurate calibration can be performed more reliably.

The shape of the marker M is circular. Accordingly, by displaying the marker M in a circular shape, the center M2 of the marker M can be easily understood. Therefore, since the object F can be guided more reliably to the center M2 of the marker M, the reliability of the highly accurate calibration can be further increased.

Second Embodiment

Next, a reference position setting method and a virtual image display device according to a second embodiment will be described with reference to parts (a) and (b) of FIG. 6. In the second embodiment, a point that a marker N different from the marker M described above is displayed and a step of making the color or shade of the outer edge N1 of the marker N different from the color or shade of the center N2 of the marker N are different from the first embodiment. In the following description, description overlapping the first embodiment will be appropriately omitted.

Figure 6:
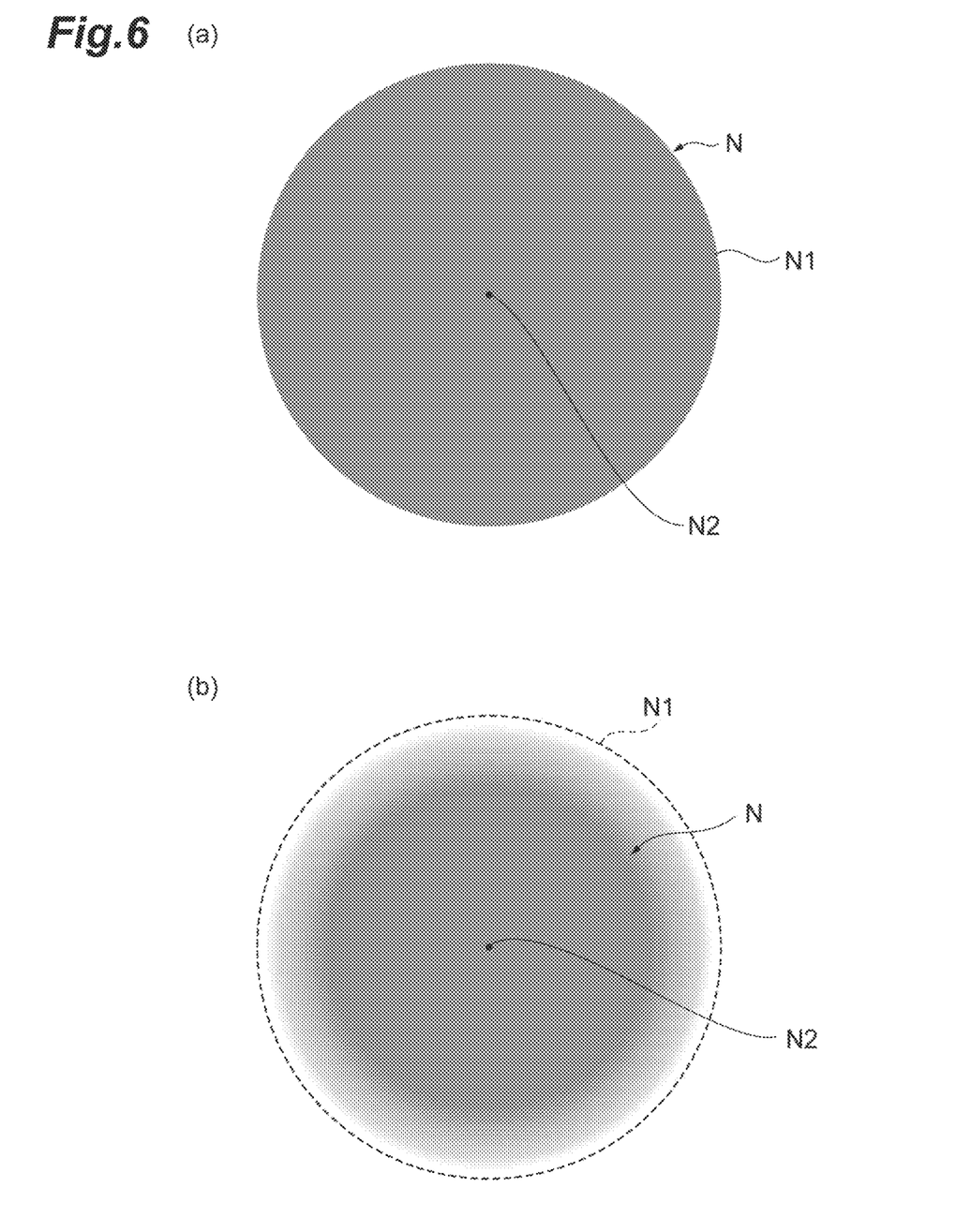

As illustrated in the part (a) of FIG. 6, in the step of making the color or shade of the outer edge N1 of the marker N different, the shape, area, color, or shade of the marker N before and immediately after the approach of the object F may be the same as that of the marker M. Then, as illustrated in the part (b) of FIG. 6, in the marker N after the approach of the object F, the color or shade of the outer edge N1 changes to a color or shade that is more difficult to visually recognize than the color or shade of the center N2.

The "color or shade that is difficult to visually recognize" may be a color or shade that is close to transparent, may be a light color or shade such as white, or may be a dark color such as black depending on a situation. That is, the "color or shade that is difficult to visually recognize" may be a color or shade that is difficult for humans to visually recognize. In the example illustrated in the part (b) of FIG. 6, the color or shade of the outer edge N1 changes to a lighter color or shade than the color or shade of the center N2. The object F is guided to the center N2 of the marker N by changing the outer edge N1 of the marker N to a color or shade that is difficult to visually recognize after the object F comes in contact with the marker N. After the object F is guided to the center N2, the position of the object F at that time is set as the reference position.

In the second embodiment, in the step of making the color or shade of the outer edge N1 of the marker N different from the color or shade of the center N2 of the marker N, the marker N is changed to have a color or shade, which is difficult to visually recognize, from the outer edge N1 of the marker N. Accordingly, by changing the color or shade of the marker N to a color or shade, which is difficult to visually recognize, from the outer edge N1 of the marker N, the object F can be guided to the center N2 of the marker N that is relatively easy to visually recognize. Therefore, since the object F can be made to approach the center N2 of the marker N more reliably, highly accurate calibration can be performed more reliably.

The embodiments of the reference position setting method and the virtual image display device according to the present disclosure have been described above. However, the present disclosure is not limited to the above-described embodiments, and may be modified or applied to other things without departing from the scope described in the claims. That is, the content and order of each step of the reference position setting method and the configuration of each unit of the virtual image display device can be appropriately changed without departing from the scope of the claims.

For example, in the above-described embodiments, the marker N in which the color or shade of the outer edge N1 changes to a lighter color or shade than the color or shade of the center N2 has been described. However, the color or shade of the outer edge of the marker may change to a darker color or shade than the color or shade of the center of the marker. In addition, in the above-described embodiments, an example has been described in which the color or shade of the outer edge N1 is changed in the step of making the color or shade of the outer edge N1 of the marker N different from the color or shade of the center N2 of the marker N. However, in the step of making the color or shade of the outer edge of the marker different from the color or shade of the center of the marker, the color or shade of the center of the marker may be changed. For example, the color or shade of the center N2 of the marker N may change from the center N2 toward the outside in the radial direction. In this manner, "making the color or shade of the outer edge of the marker different from the color or shade of the center of the marker" includes both changing the color or shade of the outer edge of the marker and changing the color or shade of the center of the marker.

In the above-described embodiments, the marker M and the marker N that are displayed in a circular shape have been described. However, the marker may have, for example, a polygonal shape such as a triangular shape, a quadrangular shape, a hexagonal shape, or an octagonal shape, or an oval shape such as an elliptical shape, and the shape of the marker is not particularly limited.

In the above-described embodiments, an example has been described in which the color or shade of each of the marker M and the marker N before and immediately after the approach of the object F is a uniform color or shade without gradation. However, the color or shade of the marker before and immediately after the approach of the object F may have gradation, or may not be a uniform color or shade. In this manner, the color or shade (that is, hue, lightness, and saturation) of the marker can be appropriately changed.

In the above-described embodiments, an example has been described in which the aerial image forming element 14 is an AI plate for forming an image in the air. However, the aerial image forming element may be, for example, a three-dimensional image forming element that forms a three-dimensional virtual image on the front side when viewed from the user, such as a hologram, or may be an element other than the AI plate.

In the above-described embodiments, the virtual image display device 1 including the sensor 12, the display device 13, the aerial image forming element 14, and the control unit 20 has been described. However, the type, shape, size, number, material, and arrangement of the sensor, the display device, the aerial image forming element, and the control unit can be appropriately changed. For example, in the above-described embodiments, the sensor 12, which is a depth sensor that detects the distance D by measuring the time from the emission of light to the return of the light reflected by the object F, has been described. However, the virtual image display device may include a sensor other than the depth sensor. That is, the virtual image display device may include an infrared sensor, an ultrasonic sensor, and the like instead of the sensor 12, and the type of sensor can be appropriately changed.

In the above-described embodiment, the virtual image display device 1 that displays, as the virtual image K, the operation unit 11 for operating each device mounted in the vehicle has been described. In addition, an example has been described in which the operation unit 11 includes the first virtual image button 11a, the second virtual image button 11b, the third virtual image button 11c, and the virtual image frame portion 11d. However, the layout and type of the operation unit can be appropriately changed. The virtual image display device may be mounted in a device other than the vehicle. The virtual image display device may be a device that displays, as a virtual image, an operation unit for operating each device other than the vehicle. In addition, the virtual image display device and the reference position setting method can be applied to various devices other than the vehicle.

REFERENCE SIGNS LIST

1: virtual image display device, 11: operation unit, 12: sensor, 14: aerial image forming element, 20: control unit, F: object, K: virtual image, M, N: marker, M1, N1: outer edge, M2, N2: center.

The invention claimed is:

1. A method for setting a reference position comprising:
displaying a marker as a virtual image larger than an object approaching the marker;
detecting the object approaching the marker;
making a color or shade of an outer edge of the marker different from a color or shade of a center of the marker after the detecting of the object; and
setting a position of the object upon the making of the color or shade of the outer edge of the marker different from the color or shade of the center of the marker as a reference position, after the making of the color or shade of the outer edge of the marker different from the color or shade of the center of the marker, the reference position being a position as a reference for recognizing whether or not the marker has been pressed.

2. The method for setting the reference position according to claim 1,
wherein, in the making of the color or shade of the outer edge of the marker different from the color or shade of the center of the marker, the marker is changed to a color or shade, which is difficult to visually recognize, from the outer edge of the marker.

3. The method for setting the reference position according to claim 1,
wherein, in the making of the color or shade of the outer edge of the marker different from the color or shade of the center of the marker, the marker is changed to be transparent from the outer edge of the marker.

4. The method for setting the reference position according to claim 1,
wherein a shape of the marker is circular.

5. A device for setting a reference position comprising:
an aerial image forming element that displays a marker as a virtual image larger than an object approaching the marker;
a sensor that detects the object approaching the marker; and
a control unit that controls display of the virtual image by the aerial image forming element,
wherein, when the object approaching the marker is detected by the sensor, the control unit makes a color or shade of an outer edge of the marker displayed by the aerial image forming element different from a color or shade of a center of the marker,
wherein the control unit sets a position of the object upon the control unit makes the color or shade of the outer edge of the marker different from the color or shade of the center of the marker as a reference position, after the control unit makes the color or shade of the outer edge of the marker different from the color or shade of the center of the marker, and
wherein the reference position is a position as a reference for recognizing whether or not the marker has been pressed.

6. The method for setting the reference position according to claim 1,
wherein the position of the object is detected a plurality of times, and
wherein an average position of the object is set as the reference position.

7. The method for setting the reference position according to claim 1, wherein the setting of the position of the object as the reference position occurs during an initial operation of a virtual image display device.

8. The method for setting the reference position according to claim 1,
wherein the setting of the position of the object as the reference position occurs during a maintenance of a virtual image display device.

9. The method for setting the reference position according to claim 1,
wherein the marker is an operation unit for an operating device mounted in a vehicle, and
wherein an area of the marker is four times or more and five times or less an area of a tip of the object.

10. The method for setting the reference position according to claim 1,
wherein the marker is displayed larger than the object before the object approaches the marker, and the marker is displayed gradually smaller after the object approaches the marker, and
wherein the position of the object is set as the reference position when a size of the marker becomes as small as a size of the object.

* * * * *